United States Patent

Back et al.

[11] Patent Number: 5,487,826
[45] Date of Patent: Jan. 30, 1996

[54] CARDBOARD MAILER PACKAGES

[75] Inventors: Gordon E. Back, Wallingford, Pa.;
Jeffrey P. Greer, Wilmington, Del.

[73] Assignee: International Envelope Company, Inc., Exton, Pa.

[21] Appl. No.: 182,307

[22] Filed: Jan. 14, 1994

Related U.S. Application Data

[63] Continuation of Ser. No. 68,464, May 27, 1993, abandoned.

[51] Int. Cl.[6] ................................................. B65D 85/57
[52] U.S. Cl. ........................................ 206/308.3; 229/313
[58] Field of Search .................................. 206/232, 307, 206/309, 312, 313, 444, 308.1, 308.3; 229/307, 309, 310, 312, 314, 316, 313

[56] References Cited

U.S. PATENT DOCUMENTS

| | | | |
|---|---|---|---|
| D. 295,536 | 5/1988 | Forbes, Jr. | D19/3 |
| D. 312,656 | 12/1990 | Huber | D19/3 |
| D. 313,040 | 12/1990 | Forbes | D19/3 |
| 1,821,011 | 9/1931 | Greenlaw . | |
| 2,310,371 | 2/1943 | Lines et al. | 229/313 |
| 2,328,380 | 8/1943 | Feder | 229/73 |
| 2,344,369 | 3/1944 | Salfisberg | 229/53 |
| 2,721,691 | 10/1955 | Makrauer | 229/55 |
| 2,895,603 | 7/1959 | Freeman | 206/46 |
| 2,985,287 | 5/1961 | Schulz | 206/46 |
| 3,038,593 | 6/1962 | Root et al. | 206/5 |
| 3,130,089 | 4/1964 | Mellinger | 148/13 |
| 3,138,248 | 6/1964 | Abbott | 206/46 |
| 3,167,242 | 1/1965 | Meyer | 229/68 |
| 3,238,599 | 3/1966 | Bauman | 29/91.1 |
| 3,307,318 | 3/1967 | Bauman | 52/743 |
| 3,378,864 | 4/1968 | Cornes | 9/11 |
| 3,412,521 | 11/1968 | Bauman | 53/36 |
| 3,419,134 | 12/1968 | Fitts | 206/47 |
| 3,420,363 | 1/1969 | Blickensderfer | 206/46 |
| 3,464,540 | 9/1969 | Stark | 206/46 |
| 3,503,177 | 3/1970 | Kropscott et al. | 53/35 |
| 3,613,879 | 10/1971 | Kemble | 206/63.3 |
| 3,648,923 | 3/1972 | Young | 229/75 |
| 3,720,212 | 3/1973 | Kaupin | 128/288 |
| 3,734,394 | 5/1973 | Dooley | 229/55 |
| 3,765,040 | 10/1973 | Holstein | 5/334 R |
| 3,784,085 | 1/1974 | Kilgore | 229/55 |
| 3,802,429 | 4/1974 | Bird | 128/146.2 |
| 4,193,499 | 3/1980 | Lookholder | 206/524 |
| 4,325,507 | 4/1982 | Janhonen | 229/55 |
| 4,401,218 | 8/1983 | Erlichman | 206/446 |
| 4,411,364 | 10/1983 | Friedman | 206/466 |
| 4,449,632 | 5/1984 | Marusiak, Jr. | 206/540 |
| 4,620,633 | 11/1986 | Lookholder | 206/523 |
| 4,727,988 | 3/1988 | Erickson | 229/313 |
| 4,781,296 | 11/1988 | Morris et al. | 206/610 |
| 4,810,571 | 3/1989 | Guthrie | 428/286 |
| 5,030,189 | 7/1991 | Hightower | 493/186 |
| 5,035,329 | 7/1991 | Kim | 229/309 |
| 5,232,150 | 8/1993 | Solomons | 229/313 |
| 5,248,032 | 9/1993 | Sheu | 206/312 |

FOREIGN PATENT DOCUMENTS

| | | | |
|---|---|---|---|
| 226860 | 7/1959 | Australia . | |
| 0481156 | 4/1992 | European Pat. Off. | 206/313 |
| 0008900 | 7/1908 | France | 229/313 |
| 0555079 | 8/1943 | United Kingdom | 229/313 |
| 2141998 | 1/1985 | United Kingdom | 206/444 |

*Primary Examiner*—Jimmy G. Foster
*Attorney, Agent, or Firm*—Panitch Schwarze Jacobs & Nadel

[57] ABSTRACT

A mailer package is formed from a single sheet of foldable stock material and includes a pair of major planar parallel panels adjoining one another and joined together along a first fold of the material. A pair of panel tabs extending from opposing edges of one panel of the pair and are secured to opposing edge portions of the remaining panel of the pair. A closure flap extends from a fourth edge of the one panel and overlaps the remaining side of the package when closed, extending between the pair of panel tabs. The closure flap abuts the panel tab when the closure flap is closed with only pull tabs at the lateral sides of the closure flap extending above the panel tabs and the remainder of the closure flap. The closure flap extends more than halfway from the closure flap fold to the opposing first fold such that the pair of panel tabs and closure flap cover more than half of a major side of the closed mailer package.

15 Claims, 2 Drawing Sheets

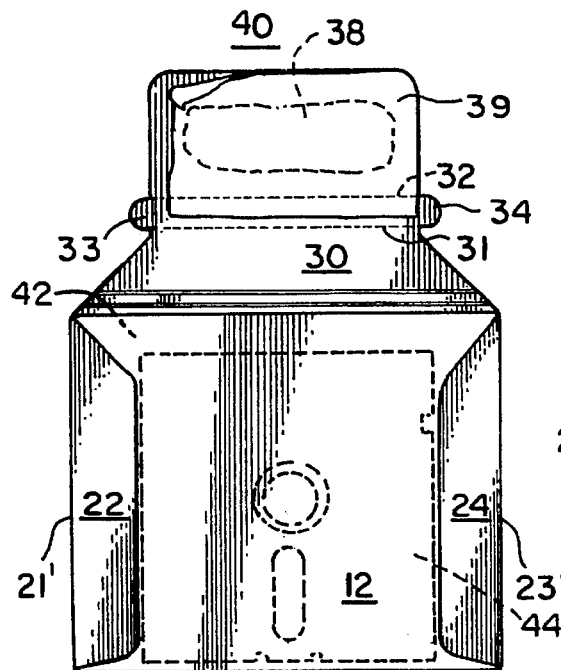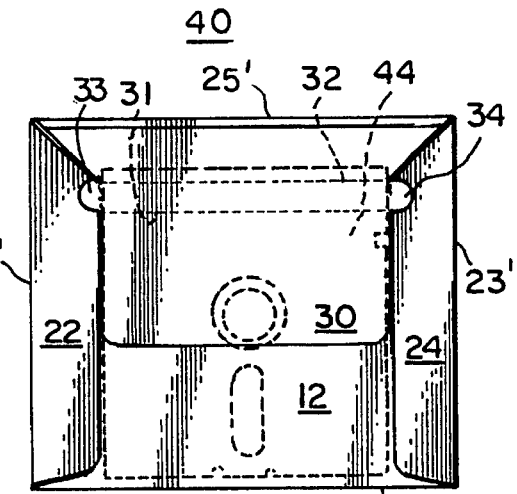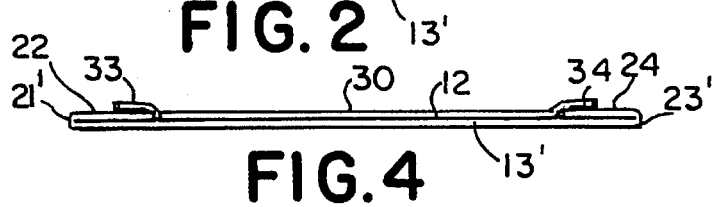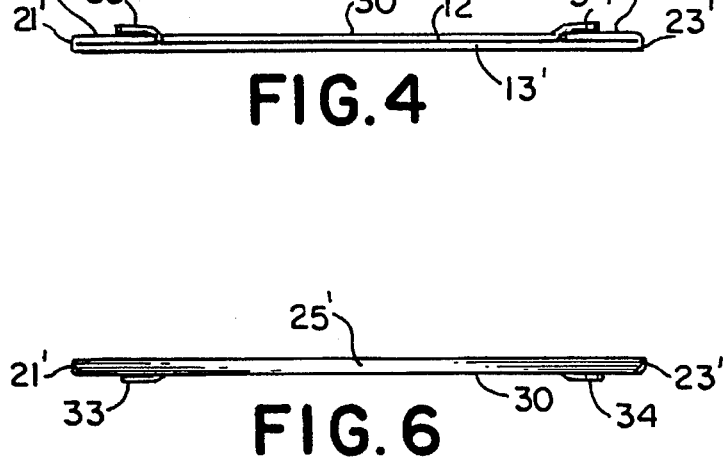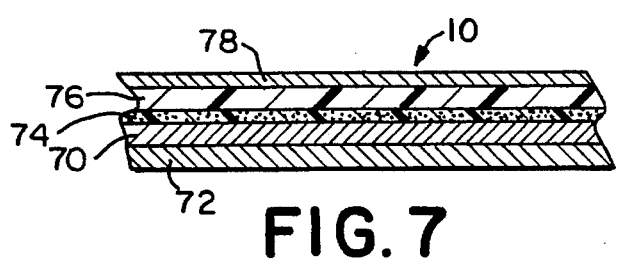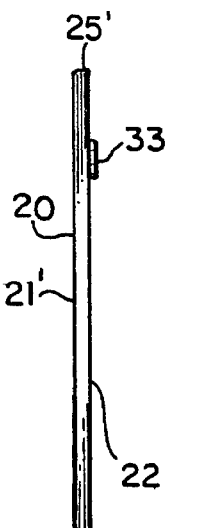

5,487,826

CARDBOARD MAILER PACKAGES

RELATED APPLICATION

This application is a continuation of application Ser. No. 08/068,464, filed May 27, 1993, now abandoned.

FIELD OF THE INVENTION

The present invention relates to packaging and, in particular, to cardboard type mailer packaging.

BACKGROUND OF THE INVENTION

Certain items such as photographs, drawings and floppy disks, which may be extremely valuable, are ordinarily sent through the mails and through private courier services despite the fact that bending or wrinkling of such items through inadequate package protection may ruin or at least greatly decrease the value of such items.

A number of different cardboard mailer designs have been used or proposed. While most provide some increased stiffness over conventional paper and plastic type envelopes, they still provide only a marginal or slight improvement against bending and folding over the protection provided by stiff paper envelopes.

Some items which are customarily mailed require still greater protection. For example, floppy disks with exposed data storage surfaces need protection from contact with abrasive surfaces within the mailer. Both paper and cardboard have surfaces which are sufficiently abrasive to pose a potential threat to the surface of any floppy disks coming into contact with such surfaces.

The only mailers currently known for protecting floppy disks from abrasion are formed of folded cardboard in a conventional fashion and provided with a separate, loose, folded foam plastic liner. The foam liners are made separately from the cardboard mailers and inserted into the mailers by the manufacturer. The number of different items being fabricated and the number of steps needed for assembly increase the cost of such mailers greatly over the cost of corresponding mailers without the foam liners, even when taking the material costs of the foam into consideration. Also, the foam material utilized is as thick or thicker than the cardboard, greatly increasing the bulk of the packaging. At the same time, the foam material provides no additional rigidity or structural strength. Typically, the foam liner material is treated with an anti-static agent to further protect the floppy disk.

SUMMARY OF THE INVENTION

The present invention is a mailer package formed from a single sheet of foldable stock material comprising: a pair of major, planar, parallel panels overlying one another and joined together along a first fold in the material, the first fold defining at least part of a first of four edges of the mailer package; a pair of panel tabs extending from opposing edges of one panel of the pair of panels, the pair of panel tabs overlapping and being secured to opposing edge portions of a remaining panel of the pair of panels; second and third folds connecting the pair of panel tabs with the opposing edges of the one panel, the second and third folds defining at least parts of second and third edges of the mailer package; and a closure flap extending from a fourth edge of the one panel, the closure flap including at least a pair of lines of perforations therethrough, the lines of perforations extending generally parallel to one another and to a fourth fold joining the closure flap and a fourth edge of the one panel, the closure flap between the lines of perforations protruding laterally from a remainder of the flap to define at least one pull tab, and a remainder of the closure flap being sized and shaped to fit between the pair of panel tabs when the sheet of material is folded along the fourth fold and on to the remaining panel with only each pull tab defined between the lines of perforations overlapping either of the pair of panel tabs.

BRIEF DESCRIPTION OF THE DRAWINGS

The foregoing summary, as well as the following detailed description of presently preferred embodiments of the invention, will be better understood when read in conjunction with the appended drawings. It should be understood, however, that the invention is not limited to the precise arrangements illustrated.

In the Drawings

FIG. 2 is a plan view of the blank of FIG. 1 after folding to define a mailer package, which is unsealed;

FIG. 3 is a plan view of the mailer of FIG. 2 with the closure flap folded and sealed against the remainder of the package;

FIGS. 4, 5 and 6 are bottom, side and top edge views, respectively, of the package of FIG. 3; and FIG. 7 is a sectional view of the blank of FIG. 1 taken along the lines 7—7.

DETAILED DESCRIPTION OF PREFERRED EMBODIMENTS

Figure 1:
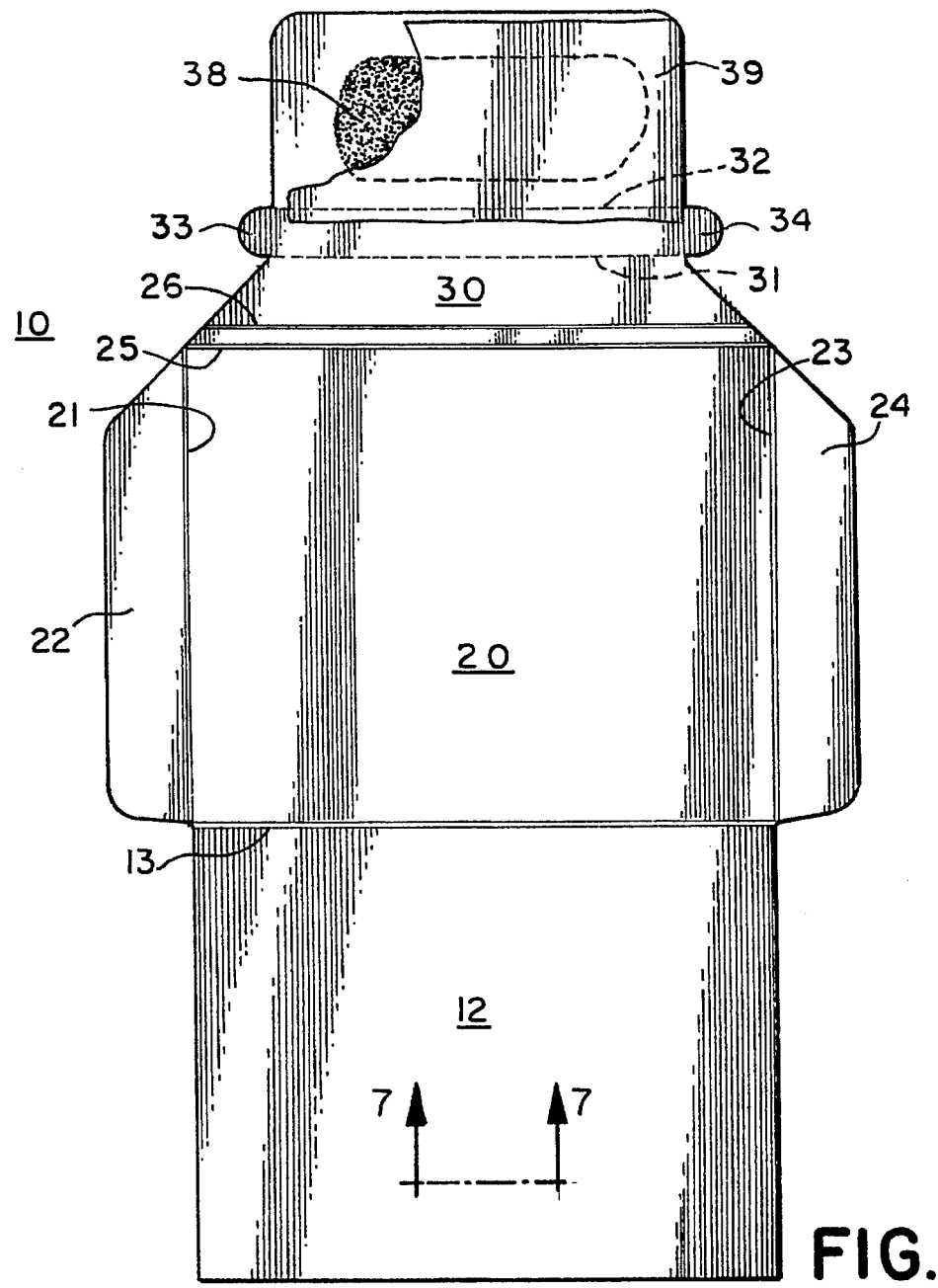
FIG. 1 is a plan view of a blank for forming a mailer package of the present invention.

FIG. 1 depicts a preferred mailer package blank indicated generally at 10. The blank 10 is preferably formed by a single sheet of foldable material of uniform thickness and composition. Various parts of the blank are defined by fold lines or lines of perforations. A pair of major, planar, parallel, rectangular panels 12 and 20 form a major portion of the blank 10. A first fold line 13 defines a first edge of each of the pair of panels 12 and 20 and simultaneously connects those panels 12 and 20 together at their first edges. A pair of panel tabs, 22 and 24 respectively, extend from opposing second and third edges of one panel 20. Fold lines 21 and 23, respectively, between the one panel 20 and each of the respective tabs 22 and 24, define the second and third edges, respectively, of the one panel 20. Second and third fold lines 21 and 23 extend generally parallel to one another and generally perpendicular to the first fold line 13 and from that first fold line 13 generally to a fourth fold line 25. The fourth fold line 25, which defines a fourth edge of the one panel, is generally parallel to the first fold line 13 and perpendicular to the second and third fold lines 21 and 23 and extends between the ends of those lines 21 and 23 which are most remote from the first fold line 12. A closure flap indicated generally at 30 extends from and is coupled with the fourth edge of the one panel 20 along fold line 25.

Preferably, the closure flap 30 is provided with a pair of lines of perforations 31 and 32, which extend through the flap 30 and are at least generally parallel to one another and to the fourth fold line 25. Preferably, the closure flap 30 between the lines of perforations 31 and 32 protrudes laterally from a remainder of the flap 30 to define at least one and preferably two pull tabs 33 and 34, respectively. A fifth fold line 26, which is parallel to and spaced slightly away from the fourth fold line 25, may be provided to ease folding of the closure tab 30 so as to more easily accommodate bulky items in the resulting package. Fold lines 13, 21, 23, 25 and 26 are formed in a conventional manner by scoring.

Preferably, an adhesive layer 38 is applied to an "inner" surface of the closure flap 30 over an area located beyond the second line of perforations 32 from panel 20. Preferably the adhesive of the layer 38 is of the pressure contact variety and is selected so that it will stick to an "outer" surface of the remaining panel 12 when contacted against that outer surface. A protective release paper 39 is preferably tacked to the adhesive layer 38, protecting that layer until use. The release paper 39 should be selected to cleanly and easily release from the selected adhesive layer 38.

FIGS. 2–6 depict a mailer package formed by bending, folding and suitably joining the various portions of blank 10. Referring to FIG. 2, open or unsealed mailer package 40 is formed by folding the remaining panel 12 along first fold line 13 to overlay the one panel 20 with the remaining panel 12. The resulting fold defines a common first edge of each of those panels 12 and 20. The common first edge, which is also the first edge of package 40, is identified by the number 13' in each of the FIGS. 2–6. The blank 10 is then folded along the second and third fold lines 21 and 23 to overlap the pair of panel tabs 22 and 24 on the outer side of the remaining panel 12. The pair of panel tabs 22 and 24 are permanently affixed to the outer surface of the remaining panel 12 by means of a suitable adhesive to define the unsealed mailer package indicated at 40. The adhesive is selected for permanently securing an "inner" surface of the panel tab 22 and 24 to the "outer" surface of the remaining panel 12. Second and third edges of the one panel 20 and of package 40 are indicated at 21' and 23' and defined by the former fold lines, 21 and 23.

Figure 8:
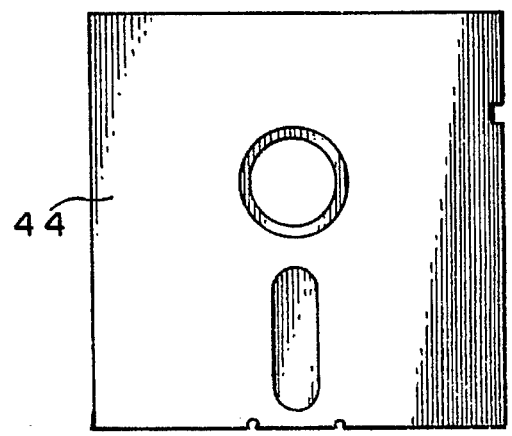
FIG. 8 is an elevational view of a floppy disk which is shown in phantom in FIGS. 2 and 3.

The unsealed mailer package 40 depicted in FIG. 2 defines a pouch having an open mouth 42 along the fourth side edge of each of the pair of panels 12 and 20. After receiving a suitable insert, for example, one or more floppy disks like floppy disk 44 of FIG. 8, the package 40 is closed, preferably by folding the blank 10 along the fourth fold line 25 or both fold lines 25 and 26, removing the release paper 39 and pulling the closure flap 30 towards the first (lower) edge 13' of the mailer 40, while pressing the layer of contact adhesive 38 against the outer surface of the remaining panel 12 to provide the fully closed mailer package now indicated at 40' and depicted specifically in FIGS. 3–6. FIGS. 4, 5 and 6 are views of the first or lower edge 13', the second or left edge 21' and the fourth or top edge 25' of package 40'. The third edge 23' is a mirror of FIG. 5 and the hidden major planar side (outside of panel 20) is featureless except for its rectangular shape.

Referring to FIGS. 3 and 4, it will be seen that the closure flap 30 has been suitably cut so as to extend between and abut the pair of panel tabs 22 and 24 when the closure flap 30 is pulled downward toward the first (lower) edge 13' of the panels 12, 20 and package 40'. Only the pull tabs 33 and 34 extend above a plane defined by the remainder of the closure flap 30 and the panel tabs 22 and 24. These can further be seen in FIGS. 4–6.

Still referring to FIGS. 3 and 4, the closure flap 30 is relatively larger than closure flaps typically provided in cardboard based mailer packages. Preferably flap 30 extends more than halfway from the fourth edge 25' to the first edge 13' and the closure flap 30 and panel tabs 22 and 24 collectively cover more than one half of the one side of the package 40' defined by panel 20. Closure flap 30 and panel tabs 22 and 24 provide nearly a third complete layer of material thickness to the mailer package 40', thereby noticeably stiffening the package 40' against bending and providing an extra layer of protective material on the rear side of the package 40'.

FIG. 7 depicts a foldable stock material preferred for use in package mailers intended particularly for mailing floppy disks. The stock material of the blank 10 preferably consists essentially of a continuous single uniform layer of "coated newsprint", which is provided by a thickness of cardboard 70 having a clay coating 72 (much exaggerated in thickness in the drawing for ease of identification). Coating 72 is provided on the outer side of the stock material and the package for appearance and to accept printing. Preferably laminated to an "inner" side of the thickness of cardboard 70 by a layer of adhesive 74 is a continuous layer of plastic material 76, which is itself preferably treated with an antistatic coating, indicated diagrammatically at 78, (also much exaggerated in thickness). The coated cardboard preferably has a thickness of at least 14 points (0.014 inches) and is preferably between about 18 and 28 points (0.018–0.024 inches) in thickness. The plastic layer may be a film or a web of non-woven plastic fiber, for example a spun bonded olefin fiber or a similar non-woven plastic fabric. An excellent spun bonded olefin material for layer 76 is a DuPont™ type 1058 D Tyvex™ material, which is treated with an anti-static composition by the manufacturer. Spunbonded olefin has excellent waterproofing qualities and significant tear strength and adds to the protection of the contents of the package in several ways. The material 76 of the blank 10 preferably totally encloses the contents of the mailer package 40', which preferably may be as many as three of the magnetic floppy disks 44 or other types of relatively bulky inserts. The plastic layer 76 further provides water and abrasion protection and, with the anti-static coating, protection against static charge build-up.

The plastic material 76 may be laminated to the uncoated surface of cardboard layer 70 through a cold laminating process with an appropriate adhesive 74 such as a Stock No. M-1018 polyolefin adhesive of Eastman Chemical Products, Inc. of Kingsport, Tenn. A Stock No. 50-0404 vinyl acetate emulsion compound from United Resin Products, Inc. of Brooklyn, N.Y. may be used to adhere the panel tabs 22, 24 to the panel 12. A United Resins Stock No. 80-8473 hot melt resin may be used as the contact adhesive of layer 38.

While a preferred embodiment has been disclosed and modifications thereto suggested, it will be recognized by those skilled in the art that other changes may be made to the above-described embodiment of the invention without parting from the broad inventive concepts thereof. It should be understood, therefore, that this invention is not limited to the particular embodiments disclosed, but is intended to cover any modifications within the scope and spirit of the invention as defined by the appended claims.

We claim:

1. A mailer package formed from a single sheet of foldable stock material comprising:

a pair of major, planar, parallel panels overlying one another and joined together along a first fold in the material, the first fold defining at least part of a first of four edges of the mailer package;

a pair of panel tabs extending from opposing edges of one panel of the pair of panels, the pair of panel tabs overlapping and being secured to opposing edge portions of a remaining panel of the pair of panels;

second and third folds connecting the pair of panel tabs with the opposing edges of the one panel, the second and third folds defining at least parts of second and third edges of the mailer package; and a closure flap extending from a fourth edge of the one panel, the closure flap including at least a pair of lines of perforations therethrough, the lines of perforations extending generally parallel to one another and to a fourth fold joining the closure flap and a fourth edge of the one panel, the closure flap between the lines of perforations protruding laterally from a remainder of the flap to define at least one pull tab, and a remainder of the closure flap being sized and shaped to fit between the pair of panel tabs when the sheet of material is folded along the fourth fold and on to the remaining panel with only each pull tab defined between the lines of perforations overlapping either of the pair of panel tabs.

2. The mailer package of claim 1 wherein the closure flap further abuts each of the pair of panel tabs.

3. The mailer package of claim 2 wherein the closure flap and the pair of panel tabs collectively cover more than one-half of the outer surface of one major side of the package.

4. The mailer package of claim 3 wherein the closure flap extends more than half-way from the four side edge to the first side edge of the package.

5. The mailer package of claim 2 wherein the closure flap extends more than half way from the fourth side edge to the first side edge of the package .

6. The mailer package of claim I in further combination with a magnetic floppy disk received between the pair of panels.

7. The mailer package of claim 1 wherein the closure flap extends more than half-way from the fourth side edge to the first side edge of the package.

8. The mailer package of claim 7 wherein the closure flap and the pair of panel tabs collectively cover more than one-half of the outer surface of one major side of the package.

9. The mailer package of claim 8 wherein the single sheet of foldable stock material comprises a layer of cardboard essentially continuously joined with a layer of plastic material.

10. The mailer package of claim 8 wherein the single sheet of foldable stock material comprises a continuous layer of cardboard laminated with a continuous layer of non-woven plastic fiber.

11. The mailer package of claim 10 wherein the foldable stock material further includes an anti-static coating on the non-woven plastic fiber layer.

12. The mailer package of claim 1 wherein the closure flap and the pair of panel tabs collectively cover more than one-half of the outer surface of one major side of the package.

13. The mailer package of claim 1 wherein the single sheet of foldable stock material comprises a layer of cardboard essentially continuously joined with a layer of plastic material.

14. The mailer package of claim 1 wherein the single sheet of foldable stock material comprises a continuous layer of cardboard laminated with a continuous layer of non-woven plastic fiber.

15. The mailer package of claim 14 wherein the foldable stock material further includes an anti-static coating on the non-woven plastic fiber layer.

* * * * *